US012221087B2

(12) United States Patent
Geis-Esser et al.

(10) Patent No.: US 12,221,087 B2
(45) Date of Patent: Feb. 11, 2025

(54) DETERMINATION OF A POSSIBLE DECELERATION VARIABLE

(71) Applicant: KNORR-BREMSE Systeme fuer Nutzfahrzeuge GmbH, Munich (DE)

(72) Inventors: Daniel Geis-Esser, Munich (DE); Tobias Schoefberger, Mainburg (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 277 days.

(21) Appl. No.: 17/881,678

(22) Filed: Aug. 5, 2022

(65) Prior Publication Data
US 2023/0045605 A1 Feb. 9, 2023

(30) Foreign Application Priority Data
Aug. 6, 2021 (DE) ...................... 10 2021 208 618.7

(51) Int. Cl.
*B60T 8/172* (2006.01)
*B60T 8/17* (2006.01)
*B60T 8/171* (2006.01)

(52) U.S. Cl.
CPC ............ *B60T 8/172* (2013.01); *B60T 8/1708* (2013.01); *B60T 8/171* (2013.01)

(58) Field of Classification Search
None
See application file for complete search history.

(56) References Cited

U.S. PATENT DOCUMENTS 5,147,114 A * 9/1992 Hommen .............. B60T 8/1893
303/DIG. 2
6,135,578 A * 10/2000 Clar ...................... B60T 8/4809
303/189
(Continued)

FOREIGN PATENT DOCUMENTS

AT 412916 B * 7/2005 .......... G01M 17/007
AU 2014204416 A1 * 2/2015 ............... A61L 9/12
(Continued)

OTHER PUBLICATIONS

German-language Office Action issued in German Application No. 10 2021 208 618.7 dated Jun. 15, 2022 (seven (7) pages).
(Continued)

*Primary Examiner* — Kevin R Steckbauer
(74) *Attorney, Agent, or Firm* — Crowell & Moring LLP

(57) ABSTRACT

A method and device for determining a possible deceleration variable of a brake system of a vehicle, wherein the brake system has at least one brake, includes providing a possible control variable value that corresponds to an actual control variable value that can be set by the brake system, wherein the at least one brake is designed to generate a deceleration variable in response to a control variable of said actual control variable value; providing a brake system model that is designed to determine a deceleration variable of the at least one brake from an input control variable value; inputting the possible control variable value into the brake system model; and determining a possible deceleration variable of the at least one brake that corresponds to the possible control variable value by way of the brake system model.

14 Claims, 3 Drawing Sheets

(56) References Cited

U.S. PATENT DOCUMENTS

| | | | | |
|---|---|---|---|---|
| 6,349,997 B1 | * | 2/2002 | Unterforsthuber | B60T 17/22 188/1.11 E |
| 6,728,621 B1 | * | 4/2004 | Walenty | B60T 8/17616 701/72 |
| 7,694,555 B2 | * | 4/2010 | Howell | B60T 17/221 73/129 |
| 8,634,971 B2 | * | 1/2014 | Cahill | F16D 66/026 244/76 R |
| 9,020,729 B2 | * | 4/2015 | Maitlen | B60T 8/321 701/70 |
| 9,475,470 B2 | * | 10/2016 | Maitlen | B60T 8/1708 |
| 10,328,921 B2 | * | 6/2019 | Fraser | B60T 7/22 |
| 10,921,821 B2 | * | 2/2021 | Lesher | B60T 7/22 |
| 11,919,526 B1 | * | 3/2024 | Agarwal | B60W 50/029 |
| 2003/0149515 A1 | * | 8/2003 | Hessmert | B60T 8/17551 701/1 |
| 2004/0068358 A1 | * | 4/2004 | Walenty | B60T 8/17616 701/80 |
| 2008/0236269 A1 | * | 10/2008 | Howell | B60T 17/221 73/121 |
| 2010/0286881 A1 | * | 11/2010 | Cahill | F16D 66/026 701/70 |
| 2016/0039292 A1 | * | 2/2016 | Takahashi | B60W 30/18109 701/70 |
| 2017/0210371 A1 | * | 7/2017 | Fraser | B60T 17/22 |
| 2021/0192959 A1 | | 6/2021 | Sujan et al. | |
| 2022/0250621 A1 | * | 8/2022 | Iba | B60W 10/18 |
| 2023/0045605 A1 | * | 2/2023 | Geis-Esser | B60T 8/172 |

FOREIGN PATENT DOCUMENTS

| | | | | |
|---|---|---|---|---|
| CA | 2175419 C | * | 8/2000 | B60T 13/665 |
| CA | 2189838 C | * | 9/2000 | B60T 13/665 |
| CN | 1477005 A | * | 2/2004 | B60T 8/172 |
| CN | 100417558 C | * | 9/2008 | B60T 8/1766 |
| CN | 101349313 A | * | 1/2009 | B60T 17/221 |
| CN | 101349313 B | * | 2/2011 | B60T 17/221 |
| CN | 105136478 A | * | 12/2015 | |
| CN | 205049352 U | * | 2/2016 | |
| CN | 107010040 A | * | 8/2017 | B60K 35/00 |
| CN | 114080339 A | * | 2/2022 | B60W 10/04 |
| CN | 115703450 A | * | 2/2023 | B60T 8/1708 |
| CN | 117794795 A | * | 3/2024 | B60T 17/22 |
| CN | 111316183 B | * | 4/2024 | B60T 7/22 |
| DE | 102008015288 A1 | * | 4/2009 | B60T 17/221 |
| DE | 10344911 B4 | * | 7/2009 | B60T 8/17616 |
| DE | 102016221185 A1 | * | 5/2017 | |
| DE | 112018006539 T5 | * | 8/2020 | B60T 7/22 |
| DE | 112020003601 T5 | * | 6/2022 | B60W 10/04 |
| EP | 1371534 A1 | * | 12/2003 | B60T 8/172 |
| EP | 1372049 A1 | * | 12/2003 | B60T 8/172 |
| EP | 2570312 A1 | * | 3/2013 | B60T 13/662 |
| EP | 2570314 A1 | * | 3/2013 | B60T 13/263 |
| EP | 2570314 B1 | * | 12/2013 | B60T 13/263 |
| FR | 2945261 A1 | * | 11/2010 | B60T 17/221 |
| GB | 2286865 A | * | 8/1995 | B60T 13/72 |
| GB | 2470098 A | * | 11/2010 | B60T 17/221 |
| JP | 2004122817 A | * | 4/2004 | |
| JP | 2004122818 A | * | 4/2004 | |
| JP | 2004122819 A | * | 4/2004 | |
| JP | 3642041 B2 | * | 4/2005 | B60K 23/0808 |
| JP | 3685343 B2 | * | 8/2005 | |
| JP | 3708011 B2 | * | 10/2005 | B60T 8/3255 |
| JP | 3821010 B2 | * | 9/2006 | |
| JP | 3870838 B2 | * | 1/2007 | |
| JP | 4051753 B2 | * | 2/2008 | |
| JP | 2021020533 A | * | 2/2021 | B60W 10/04 |
| JP | 7368975 B2 | * | 10/2023 | B60W 10/04 |
| WO | WO-02053425 A1 | * | 7/2002 | B60T 8/17551 |
| WO | WO-2009009161 A1 | * | 1/2009 | F16H 59/66 |
| WO | WO-2014167643 A1 | * | 10/2014 | B60L 15/2009 |
| WO | WO-2021019955 A1 | * | 2/2021 | B60W 10/04 |
| WO | WO-2023012189 A1 | * | 2/2023 | B60T 17/22 |
| WO | WO-2023213955 A2 | * | 11/2023 | B60L 7/10 |
| WO | WO-2024048323 A1 | * | 3/2024 | |

OTHER PUBLICATIONS

German-language Search Report issued in German Application No. 10 2021 208 618.7 dated Jun. 15, 2022 with partial English Translation (six (6) pages).

* cited by examiner

DETERMINATION OF A POSSIBLE DECELERATION VARIABLE

CROSS REFERENCE TO RELATED APPLICATION

This application claims priority under 35 U.S.C. § 119 from German Patent Application No. 10 2021 208 618.7, filed Aug. 6, 2021, the entire disclosure of which is herein expressly incorporated by reference.

BACKGROUND AND SUMMARY

The present invention relates to a method for determining a possible deceleration variable and to a device, a vehicle, a computer program product and a storage medium for carrying out the method.

Through the development of electrically driven vehicles and the associated possibility of achieving a brake effect on the vehicle by means of generator operation of the electric drive machine, there are approaches to saving on conventional permanent brake apparatuses, such as retarders, for example. Due to the limited storage capacity of the corresponding electrical energy store and the associated limited recuperation and thus braking ability, on the one hand legal requirements have been issued or are due to come into force according to which the driver, in particular in the commercial vehicle sector, has to be informed about the brake performance of their vehicle, with this dealing in particular with the mechanical brake. Said mechanical brake is used at the latest when no permanent brake function, for example by means of the generator operation of the electric drive machine, is available. In particular, it is therefore endeavoured to inform the driver about the maximum possible deceleration of the vehicle. However, irrespective thereof, that is to say even given other types of road vehicles, such as vehicles driven by conventional drive or hybrid drive, there is also the need to be able to determine the brake performance as accurately as possible in order on the one hand to be able to react during a driving situation and on the other hand also to design maintenance measures to be better, in particular more efficient.

Modern vehicles provide the option of roughly ascertaining the wear of the brake pads. The total wear in a disc brake, that is to say the total wear of both pads and of the disc, is thus monitored. For this purpose, use is made of either a potentiometer that responds as soon as the wear of the pad is correspondingly advanced or a continuous potentiometer whose signal also permits conclusions about the advancement of the wear before complete wear. As an alternative, a sliding contact can also be used; this makes contact when it has been exposed due to wear.

It is not possible to determine a possible deceleration variable, for example a brake torque, or a possible vehicle deceleration.

It is therefore the object of the present invention to solve this problem.

This object is achieved by the subjects of the independent claims. Advantageous refinements are the subject matter of the dependent claims.

Within the context of this application, a possible variable, such as a possible control variable, a possible deceleration variable or a possible vehicle deceleration is intended to be understood as meaning a variable that can currently be achieved in terms of value by the system under consideration, the actuator under consideration or the like. That is to say this means the currently available value range or specifically a particular value that the corresponding variable can assume.

Within the context of this application, a trailer is to be understood as meaning any possible form of trailer. In particular, a trailer may include a semi-trailer or a drawbar trailer. A towing vehicle may be a vehicle that can tow a trailer under its own power. However, it may also be a vehicle that is towed for its part, with it being able to tow another trailer at the same time. In particular, it may be a dolly or a trailer that is designed to be coupled to another trailer.

The invention provides a method for determining a possible deceleration variable of a brake system of a vehicle, wherein the brake system comprises at least one brake, wherein the method comprises the following steps:
  providing a possible control variable value that corresponds to an actual control variable value that can be set by the brake system, wherein the at least one brake is designed to generate a deceleration variable in response to a control variable of said actual control variable value;
  providing a brake system model that is designed to determine a deceleration variable of the at least one brake from an input control variable value;
  inputting the possible control variable value into the brake system model; and
  determining a possible deceleration variable of the at least one brake that corresponds to the possible control variable value by way of the brake system model.

The deceleration variable that can be achieved with a determined control variable is thus determined. To this end, use is made of a brake system model that maps the behaviour of at least one brake of the vehicle onto an actual control variable with the corresponding control variable value.

The deceleration variable is preferably a brake torque or a brake force that is generated by the at least one brake in response to the control variable.

The possible control variable value preferably includes a maximum possible control variable value. This has the advantage that the maximum possible deceleration variable can thus be determined. That is to say it is possible at any time to make a statement about how strong or efficient the corresponding brake still is or is at the moment.

The possible deceleration variable is therefore determined by taking into account a control variable that can be set during operation. That is to say the brake system is technically restricted during operation, for example because an actuator for actuating the brake is faulty; it is thus possible to take into account the fact that a lower deceleration variable is able to be achieved due to the restricted control variable. Furthermore, the brake system model can also take into account which deceleration variable can be set by the possible control variable, that is to say which deceleration variable is able to be achieved. If the brake system model is used to take into account a deterioration or generally a change in the state of the brake, it is therefore possible to use the present method to determine a possible, that is to say an achievable, deceleration variable.

The brake system model is preferably designed to take into account the state of the brake by taking into account input variables from the vehicle. It is therefore possible to map a control variable or a control variable value onto a corresponding deceleration variable, with this mapping being carried out according to the state of the at least one brake. If, for example, a temperature of the at least one brake is determined by the vehicle by being measured or ascertained by means of a model, the brake system model can take into account a change in the physical properties, in particular a change in the mapping of the control variable or the control variables onto the deceleration variable. In this way, a determination of possible deceleration variables, in particular a determination of a maximum deceleration variable, can be taken into account by the brake system model.

A further input variable can be provided by inputting a wear variable of the at least one brake. As is described further below, this may be a travel and/or an actuating angle, with it being possible to take into account in particular when these variables assume a maximum value, which indicates an increased wear.

The possible control variable value preferably includes a value of a contact force, an application force, an actuator force, an actuator pressure, an actuator current and/or an actuator voltage. A contact force can generally describe the contact intensity of a friction element on a corresponding counterpart. An application force can describe the application intensity of the brake elements of a brake pad against a brake disc. An actuator force can describe the force of an actuator that is designed to introduce said actuator force into the brake system. Such an actuator is preferably actuated fluidically, that is to say in particular pneumatically or hydraulically, or electromechanically. Accordingly, an actuator pressure, that is to say a fluidic pressure, or an actuator current or an actuator voltage can also be considered as control variable.

The brake system or the at least one brake preferably comprises a brake that is actuated fluidically, in particular pneumatically or hydraulically, and/or a brake that is actuated electromechanically.

The at least one brake of the brake system preferably comprises a friction brake. A friction brake may be in particular a drum brake or a disc brake. By determining the possible deceleration variable of this brake, for example, a statement is made about a possible brake torque that is generated by the brake.

The brake system model preferably includes as further input variable a temperature, in particular of the brake, a travel and/or an actuating angle. The possible deceleration variable can thus be determined by the brake system model depending on a temperature, in particular a temperature of friction elements of the brake such as, for example, brake pads and/or a brake disc. The determination of the possible deceleration variable can be improved and/or a statement regarding the wear of the brake can be made also by the brake system model taking into account a travel and/or an actuating angle. Brakes that are affected by wear are actuated by translational and/or rotatory acting mechanisms, in particular transmission mechanisms, and/or actuators. If the wear increases, this results in greater travels and/or actuating angles. These can be detected, as a result of which a statement regarding the wear can be made. If the mechanisms or actuators have readjustment devices that are designed to at least partly equalize the influence of the wear on the travel and/or actuating angle, it is also conceivable to determine the wear by detecting this readjustment, that is to say in particular by the value by which the travel and/or the actuating angle has/have been readjusted. Taking into account the travel and/or the actuating angle can also include taking into account when the wear has advanced in such a way that a stop is contacted and/or the travel and/or actuating angle assume a maximum permissible value.

The method preferably comprises a step in which the determined possible deceleration variable is compared with a limit value. The limit value may be of constant or variable form, for example. If it is determined that the possible deceleration variable does not reach the limit value, it must be concluded therefrom that the state, in particular the state of wear, of the at least one brake is no longer optimal. For example, maintenance of the brake can then be provided. If a maximum deceleration variable is determined with a maximum possible control variable, with this maximum deceleration variable not reaching the corresponding limit value, this constitutes a safety-critical problem that may also require countermeasures during the journey. For example, the vehicle may be forced to stop.

As an alternative or in addition, the method comprises a step in which a possible vehicle deceleration is determined from the determined possible deceleration variable. This possible vehicle deceleration can also be compared with a corresponding limit value. This limit value may be of constant or variable form, for example. The above considerations also apply here analogously. If it is determined in particular that the maximum possible vehicle deceleration undershoots a limit value, there is thus a safety-critical problem that may also require countermeasures during the journey. For example, the vehicle may be forced to stop.

A warning can also be output to the driver depending on the result of the evaluation of the possible deceleration variable and/or the possible vehicle deceleration.

The limit value and/or the possible vehicle deceleration are/is preferably determined depending on a vehicle weight, a force transfer ability between tyre and road, a route gradient, an operating state of a drive train of the vehicle and/or the availability of other brake systems.

In general, a vehicle weight, a force transfer ability between tyre and road, a route gradient, an operating state of a drive train of the vehicle and/or the availability of other brake systems can also be used to determine other variables by way of the method.

A vehicle weight may include for example an unladen weight of the vehicle, an actual load capacity, an actual weight and/or a maximum permissible weight. For example, a weight, such as the actual weight, can be determined by the vehicle itself, for example by determining the spring travel in the compressed state or by appropriate force sensors. In addition or as an alternative, however, a weight can also be taken into account by means of estimating or assuming the corresponding weight. For example, this may be the case when a trailer is coupled to a vehicle and the weight thereof can be only estimated or assumed but not determined by means of measurement. Furthermore, provision may be made for a weight to be taken into account by means of an input. For example, a person can input the known weight of a load capacity of the vehicle as input variable for the method. The vehicle weight can also be determined from an additional drive power that is required to accelerate the vehicle or move the vehicle on an incline, in particular compared to the operation of the vehicle with a reference weight, for example the unladen weight. A brake power, in particular a brake power in generator operating mode, can be used to infer the vehicle weight. In this case, the brake power is preferably detected when travelling on a downhill gradient. As an alternative or in addition, the vehicle weight can also be drawn from other vehicle systems, such as a suspension, stabilization or brake system (for example EBS, ABS, ESP).

A force transmission capability between tyre and road is firstly characterized by the friction value between tyre and road. This can be estimated by means of known methods or can be assumed to be a constant value, for example.

The route gradient can be taken from digital map material or can be determined by means of measurement, for example. It can be taken into account for example using a gradient value or a gradient angle. For example, a slope detection system of the vehicle and/or acceleration sensors of the vehicle can be used for measurement. In this case, it should be taken into account that a lower limit value may be permissible in the event of an incline, that is to say a journey uphill, since in this case the downhill force supports a braking or stopping process despite a possible deceleration variable that comparatively is determined as low. In contrast thereto, a higher limit value may be used on a downhill gradient at the same determined possible deceleration variable. In this case, the downhill gradient would counteract a braking or stopping process such that the brake system of the vehicle also has to compensate for the downhill gradient.

An operating state of the drive train can be understood for example as meaning a transmission ratio at which the drive train is operated. In vehicles driven by conventional drive or hybrid drive, this may be the transmission ratio at which an internal combustion engine has a braking effect on the vehicle in coasting mode. In a vehicle driven by electric motor, instead of an internal combustion engine, the electric drive machine acting in generator operation can have a braking effect on the vehicle by means of the transmission ratio. In a vehicle driven by hybrid drive, both the internal combustion engine and an electrically driven drive machine can have a braking effect by means of the same transmission ratio or different transmission ratios. The operating state can also include the current storage capacity of an electrical energy store. If, for example, a braking effect is generated by an electric drive machine in generator operation, the resulting energy can be stored in the corresponding energy store only if there is enough current storage capacity available therein. If this is not possible, the brake in generator operation can no longer be used when the energy arising cannot be consumed in another way. In this case, the limit value has to be decreased accordingly.

Finally, the availability of other brake systems can also understood to mean instances of damage, deterioration but also the above-described availability of a brake in generator operation or a permanent brake.

The method is preferably designed so that the possible deceleration variable of a brake is assigned to the at least one brake. That is to say it is possible to determine a corresponding possible deceleration variable individually for a brake under consideration that the brake would generate in response to a corresponding control variable.

However, it is also possible to assign one possible deceleration variable to several or all brakes of the at least one brake. This may be expedient in particular when individual brakes cannot be detected separately by the brake system model or no input variables can be input into the brake system model in relation to these brakes. The possible deceleration variable can then include in particular an average value of the corresponding brakes or a maximum or minimum value. Provision may therefore be made for such a possible deceleration variable to be determined from the specification of a possible control variable.

When the vehicle comprises at least one further brake system having at least one further brake, the possible deceleration variable of which is not determined by the brake system model, the possible deceleration variable of the at least one further brake can preferably be determined from an achieved brake effect, such as a vehicle deceleration, in the case of braking actually being effected. If the vehicle is braked, on account of the determined possible deceleration variable of the brakes, the possible deceleration variable(s) of which is are determined by the brake system model, and/or account of the actual deceleration variable of these brakes, the proportion of the brake effect thereof can be determined. In this case, an actually achieved deceleration of the vehicle can be used as braking effect, the actually achieved deceleration being able to be detected for example by means of an acceleration sensor and/or by means of considering the speed before and after the braking, in particular the speed difference resulting therefrom. It is thus also possible to determine the proportion of the brakes whose possible deceleration variable is not determined by the brake system model from said thus determined braking effect and the proportion of the brakes whose possible deceleration variable is known or has been determined. In this way, when the control variable is known, the at least one further brake can be assigned an actual deceleration variable that can then be converted, in particular extrapolated, for example to form a deceleration variable corresponds to another possible control variable.

The at least one further brake is preferably provided in a further vehicle part that is connected to a first vehicle part in an articulated manner. The further vehicle part can in this case include a trailer that is coupled to the first vehicle part. The first vehicle part can comprise a towing vehicle and/or a further trailer. However, provision may also be made for both vehicle parts to form an articulated vehicle that is not coupled to the trailer and towing vehicle according to the design. This includes, for example, buses whose front section (first vehicle part) and rear section (further vehicle part) are connected to one another in an articulated manner.

A force is preferably measured between the first and the further vehicle part, in particular a coupling force is measured. This can be done, for example, by means of a detection means, in particular by means of a force sensor, in the coupling point that detects thrust and pulling forces between the vehicle parts. The information from the force measurement can then be used to infer the actual deceleration variable of the further brake. If the further vehicle part is arranged behind the first vehicle part in the direction of travel and if, for example, a thrust is measured at the coupling point during braking, the further vehicle part pushes the first vehicle part. If this thrust is higher than, for example, a predetermined limit value or if this thrust does not correspond to the expected behaviour, it is possible to infer that the further brake does not reach the deceleration variable that actually corresponds to the control variable actually set. If a pulling force is measured at the coupling point during braking, the further vehicle part decelerates to a greater extent than the first vehicle part. If it is possible to infer from the previous observation that the brakes for which a possible deceleration variable is determine are intact, this indicates that the at least one further brake generates too high a deceleration variable. However, this information can also be used to infer that the brakes whose possible deceleration variable is determined are in a poor state, such that they do not reach said deceleration variable.

The at least one further brake is preferably provided on a trailer and/or a lift axle of the vehicle.

In general, a brake force distribution can also be taken into account when carrying out the method. If, for example, it is known that particular brakes, for example the brakes at the front of the vehicle, experience a control variable with a higher control variable value, the loading thereof can be taken into account by the brake system model and/or if this is not possible indirect loading can be determined through knowledge of the vehicle deceleration or the braking effect and the known deceleration variables.

The brake system is preferably updated based on a history of brake interventions. In order to improve the accuracy of the brake system model, provision may be made for brake interventions that have already been carried out, that is to say values relating to actually set control variables and the resulting braking effect, to be used to update the brake system model. In particular, this involves comparatively recent braking interventions in order as far as possible to take the current state of the at least one brake as the basis for the updating. However, in addition or as an alternative, provision may be made for only braking processes that have a particular minimum control variable value to be taken into consideration, in particular when the brake system model is used to determine the maximum possible deceleration value. Provision is preferably made for the brake system model to be updated periodically or else permanently. As an alternative or in addition, provision is made for unscheduled updating to be carried out. This may be forced for example by the driver or may be triggered by changes in the vehicle, such as for example when the occupancy or the vehicle configuration changes by virtue of a vehicle part being exchanged, coupled or decoupled.

The brake system model preferably comprises a characteristic map and/or a physical model of the at least one brake. In particular, provision may be made for the brake system model to be operated using a proportionality factor or a brake characteristic value that permits a proportional conversion from control variable to deceleration variable. The proportionality factor can be applied as a constant value, can be stored in a characteristic map or can be calculated by means of a physical model. The proportionality factor can formed in particular depending on the following input variables, as have been described further above:

temperature, in particular of the brake,
travel and/or
actuating angle

A calculation of the possible control variable therefore preferably results according to the following correlation:

possible deceleration variable=proportionality factor*possible control variable.

The proportionality factor can include further parameters, such as for example a transmission ratio or an efficiency between the control variable and the deceleration variable. In the specific case of the design of the brake as a disc brake, an average friction radius can also be taken into account or can already be included in the transmission ratio.

Another aspect of the invention provides a device for carrying out the method described above, comprising:
an interface for receiving input variables;
an interface for outputting the possible deceleration variable of the at least one brake; and
a data processing unit that is designed to carry out the method described above.

Such a device can be designed for example as a brake controller or can provide a portion of the functionality of a brake controller. However, provision may also be made for the device to constitute a superordinate independent functional unit or a functional unit integrated into another apparatus for the purpose of brake monitoring.

The data processing unit preferably comprises electronic means for data processing.

Another aspect of the invention provides a vehicle for carrying out the method described above, wherein the vehicle is designed to carry out the method described above and/or comprises a device described above, wherein
the vehicle is preferably designed as a commercial vehicle, a lorry, a trailer, a bus and/or as a combination of a towing vehicle and a trailer, and/or wherein
the vehicle is preferably designed as a vehicle driven purely by electric motor, by hybrid drive or by conventional drive.

Another aspect of the invention provides a computer program product comprising program code that is configured so that, when it is executed on a data processing unit, in particular a data processing unit mentioned above, it causes said data processing unit to execute the method described above. It is thus advantageously possible to correspondingly enable existing devices and/or vehicles with data processing units so that they can then execute the method described above.

Another aspect of the invention provides a storage medium having a computer program product described above. In this way, it is possible to simply pass on the computer program product in order to correspondingly enable devices with data processing units or vehicles, for example. A corresponding storage medium comprises for example a CD-ROM, a memory stick, a memory card or else a cloud store from which the computer program product can be downloaded.

All of the features that have been used above in the description of the method can also be transferred analogously to the other subjects of the device, vehicle, computer program product and storage medium. If the description of the method has already directly mentioned a feature of these subjects, this can be understood as an optional feature of the corresponding subject.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
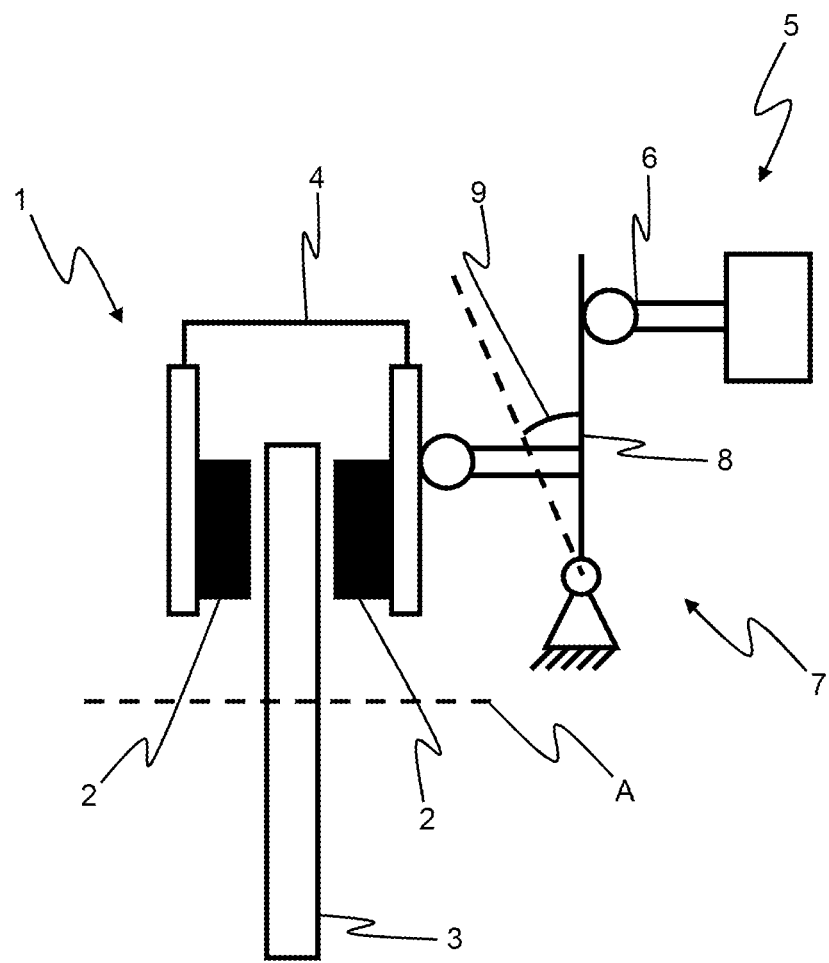
FIG. 1 is a basic design of a brake and the actuation thereof.

FIG. 1 shows a basic design of a brake and the actuation thereof.

The exact illustration of all of the components has been omitted here. The drawing in FIG. 1 shows only a function principle.

The brake 1 is designed here as a friction brake that comprises brake pads 2 and a brake disc 3 that is able to rotate about an axis A. The brake pads are provided in a brake caliper 4 that straddles the brake disc 3. The brake pads 2 and the brake disc 3 function as frictional elements that can be brought into contact with one another in a frictional manner in order to generate a deceleration variable.

An actuator 5 is provided to actuate the brake 1. The actuator comprises an actuating element 6 that can be shifted to the left in a translational manner in the drawing.

A transmission mechanism 7, which comprises an actuating lever 8 that is designed so as to be able to pivot in the plane of the drawing, is provided between the actuator 5 and the brake 1. The transmission mechanism 7 is connected on one side to the actuator 5 so that a displacement of the actuating element 6 is introduced into the transmission mechanism 7, as a result of which the actuating lever 8 is pivoted in the anti-clockwise direction. The transmission mechanism 7 is in contact on the other side with the brake 1 in order to introduce a displacement or force resulting from the displacement of the actuating element 6 into the brake 1 in order to make contact with the brake pads 2 by way of the brake disc 3 in order to generate the deceleration variable of the brake 1.

In the case of a disc brake, the deceleration variable may be a brake torque that results from an application force, that is to say a force with which the brake pads 2 are pressed against the brake disc 3, and an average friction radius.

The transmission mechanism 7 provides a transmission ratio that describes the transmission of an actuator force or the resulting displacement of the actuating element 6 to the application force.

In order to determine a deceleration variable that can be generated using the brake 1 in response to a control variable, a brake system model that takes these conditions into account can therefore be provided. In particular embodiments, a proportionality factor is provided here, which maps a conversion of the control variable to the deceleration variable. If an efficiency, for example of the entire arrangement shown or parts thereof, is known, a possible brake force can be calculated by a possible control variable being input into the brake system model:

$$M_B = c^* \times i \times F_z \times \eta \times R_m$$

$M_B$: deceleration variable
$c^*$: proportionality factor
i: transmission ratio
$F_z$: actuator force
$\eta$: efficiency
$R_m$: average friction radius The actuator 5 is generally held here. In some embodiments, the actuator 5 is designed as a fluidically actuated, in particular pneumatically or hydraulically actuated, actuator. According to other embodiments, the actuator 5 is electrically actuated, that is to say a brake 1 that is actuated in such a way can be attributed to an electromechanical brake system. In the case of fluidic actuation, the actuator 5 may comprise a cylinder with pistons in order to displace the actuating element 6 by means of pressure. In the case of electrical actuation, the actuator 5 may comprise a linear motor or a rotatory electric motor, with the rotary movement thereof then preferably being converted to a translational movement by means of a corresponding mechanism in order to displace the actuating element 6.

According to other embodiments, the transmission mechanism 7 may be omitted. It is therefore also possible for the actuator 5 or the actuating element 6 thereof to act directly on the brake 1, that is to say without transmission, and there to cause the friction elements 2, 3 to be pressed against one another.

The brake 1 can finally also be based on another technical or physical principle. For example, a drum brake or a friction brake that comes into contact with a friction element that is stationary in relation to the vehicle, such as for example in the case of a magnetic rail brake, is conceivable.

Figure 2:
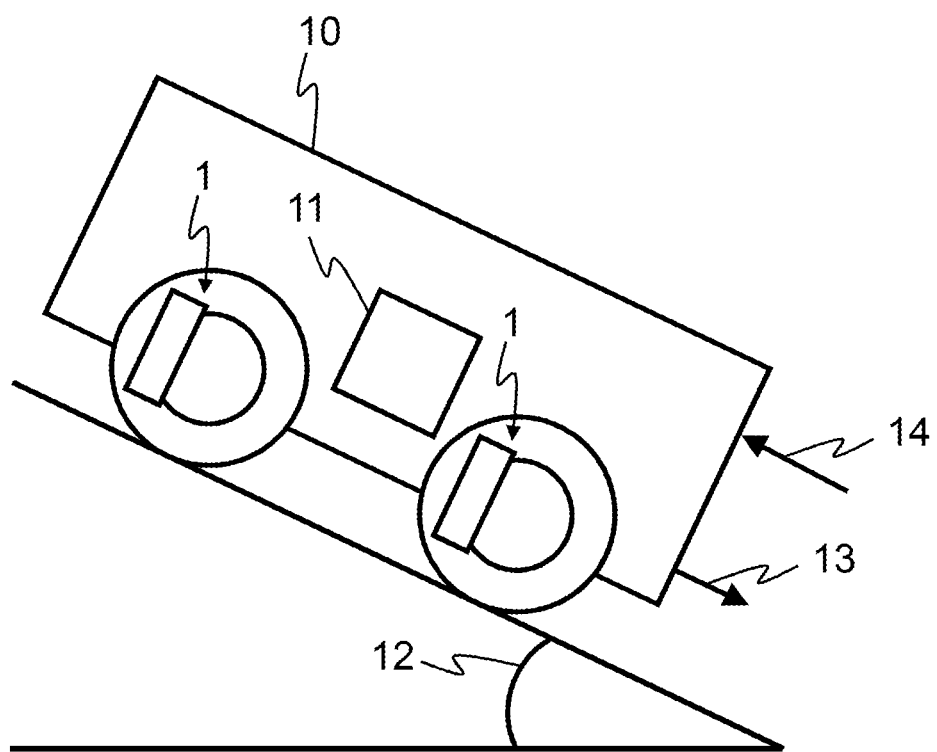
FIG. 2 shows influencing parameters on the brake process.

FIG. 2 shows a basic illustration of influencing parameters on the braking process of a vehicle.

Shown is a vehicle 10 that is travelling on an incline that has the gradient angle 12. The gradient angle can be determined for example by slope measurement or digital map material. In addition to an inclination angle 12, other suitable variables can also be used, such as a pitch, for example.

The vehicle 10 comprises a drive train 11 and brakes 1. The brakes 1 can be designed correspondingly to the brakes in FIG. 1. The drive train 11, which is depicted here only schematically, may be a conventional, hybrid or electric drive train. For example, the drive train 11 influences the braking by way of electrical energy stores that are no longer capable of receiving energy, such that it is no longer possible to brake in generator operation.

A downward gradient force 13 is also shown. This depends on the gradient angle 12 and the weight of the vehicle, which can be defined or determined as described above.

The vehicle deceleration 14 is oriented counter to the downhill direction of travel. The vehicle deceleration can be determined given knowledge of the possible deceleration variable, that is to say for example a possible brake torque, of the brake 1 or the brakes 1 and vehicle parameters, such as a vehicle weight. If the vehicle deceleration is too low in comparison with a limit value that is stipulated for example by legislation, suitable countermeasures must be taken, such as a warning, maintenance or else termination of the driving operation.

Figure 3:
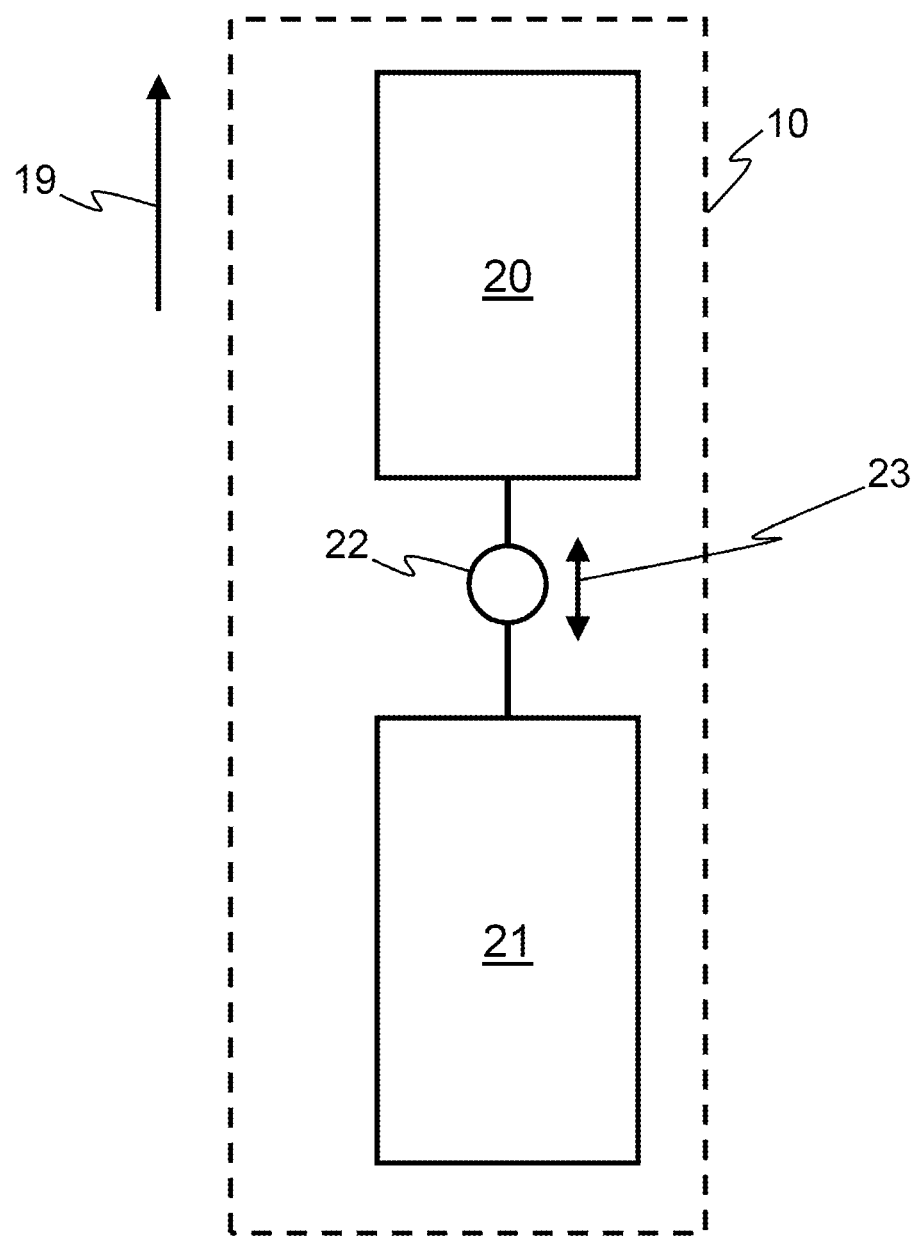
FIG. 3 is a schematic plan view of a vehicle.

FIG. 3 shows a schematic plan view of a vehicle.

The vehicle 10 comprises a towing vehicle 20 and a trailer 21, which are connected to one another at a coupling point 22 such that the trailer 21 can be towed by the towing vehicle 20 in the direction of travel 19. The towing vehicle 20 and the trailer 21 each have at least one brake (not illustrated). The towing vehicle 20 forms a first vehicle part that is connected in an articulated manner to a further vehicle part, the trailer 21. The vehicle parts shown here are connected to one another in a releasable manner. However, it is also contemplated that this connection is not of releasable design, that is to say that both vehicle parts function not as a towing vehicle 20 and trailer 21 but, for example, form an articulated vehicle, such as an articulated bus.

The coupling point 22 is designed to ascertain a coupling force 23 between the vehicle parts, for example by means of a coupling force detection device, in particular by means of a coupling force sensor. In particular, it is possible to make a statement here about the braking effect of the vehicle parts.

If it is determined that the coupling force 23 during a braking process indicates sliding of the rear vehicle part, in this case the trailer 21, it is thus possible to infer a greater braking or a greater braking effect of the front vehicle part when comparing both vehicle parts. In contrast, if it is determined that there is pulling at the coupling point 22, this indicates a greater braking or a greater braking effect of the rear vehicle part.

If, for example, the deceleration variable of the at least one brake is able to be determined only in one vehicle part, that is to say only in the towing vehicle 20 or in the trailer 21, the deceleration variable of the at least one brake of the vehicle part that cannot be detected by the brake system model can be inferred based on the coupling force 23 by determining the actual braking effect during braking as described above and inferring the deceleration variable of the at least one brake of said vehicle part from the coupling force 23 when the control variable is known or when the control variable value is known.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Brake
2 Brake pads
3 Brake disc
4 Brake caliper
5 Actuator
6 Actuating element
7 Transmission mechanism
8 Actuating lever
9 Actuating angle
10 Vehicle
11 Drive train
12 Gradient angle
13 Downward gradient force
14 Vehicle deceleration
19 Direction of travel
20 Towing vehicle
21 Trailer
22 Coupling point
23 Coupling force
A Axis

What is claimed is:

1. A method for determining a possible deceleration variable of a vehicle brake system having at least one brake, the method comprising the steps of:
   providing a possible control variable value that corresponds to an actual control variable value that is settable by the brake system, wherein the at least one brake is designed to generate a deceleration variable in response to a control variable of said actual control variable value;
   providing a brake system model that determines a deceleration variable of the at least one brake from an input control variable value;
   inputting the possible control variable value into the brake system model;
   determining a possible deceleration variable of the at least one brake that corresponds to the possible control variable value by way of the brake system model,
   wherein the vehicle comprises at least one further brake system having at least one further brake, the possible deceleration variable of which is not determined by the brake system model, wherein the possible deceleration variable of the at least one further brake is determined from an achieved brake effect in case of braking actually being effected.

2. The method according to claim 1, wherein
   the possible control variable value includes a maximum possible control variable value.

3. The method according to claim 1, wherein
   the possible control variable value includes a value of a contact force, an application force, an actuator force, an actuator pressure, an actuator current, and/or an actuator voltage.

4. The method according to claim 1, wherein
   the at least one brake of the brake system comprises a friction brake.

5. The method according to claim 1, wherein
   the brake system model includes as a further input variable, a temperature of the at least one brake, a travel, and/or an actuating angle.

6. The method according to claim 1, further comprising at least one of the following steps:
   (i) comparing the determined possible deceleration variable with a limit value; or
   (ii) determining a possible vehicle deceleration from the determined possible deceleration variable,
   wherein the limit value and/or the possible vehicle deceleration is determined depending on a vehicle weight, a force transfer ability between tire and road, a route gradient, an operating state of a drive train of the vehicle, and/or an availability of other brake systems.

7. The method according to claim 1, wherein
   the possible deceleration variable is assigned to one brake, a plurality of brakes, or all brakes of the vehicle.

8. The method according to claim 1, wherein
   the at least one further brake is provided in a further vehicle part that is connected to a first vehicle part in an articulated manner, wherein
   a force is measured between the first and the further vehicle part.

9. The method according to claim 1, wherein
   the brake system model comprises a characteristic map and/or a physical model of the at least one brake.

10. A method for determining a possible deceleration variable of a vehicle brake system having at least one brake, the method comprising the steps of:
    providing a possible control variable value that corresponds to an actual control variable value that is settable by the brake system, wherein the at least one brake is designed to generate a deceleration variable in response to a control variable of said actual control variable value;
    providing a brake system model that determines a deceleration variable of the at least one brake from an input control variable value;
    inputting the possible control variable value into the brake system model;
    determining a possible deceleration variable of the at least one brake that corresponds to the possible control variable value by way of the brake system model; and
    updating the brake system model based on a history of brake interventions by inputting values into the brake system model relating to actually set control variables and the resulting braking effect on the at least one brake.

11. A device for determining a possible deceleration variable of a vehicle brake system, of a vehicle, having at least one brake, comprising:
    an interface for receiving input variables;
    an interface for outputting the possible deceleration variable of the at least one brake; and
    a data processing unit configured to:
    provide a possible control variable value that corresponds to an actual control variable value that is settable by the brake system, wherein the at least one brake is designed to generate a deceleration variable in response to a control variable of said actual control variable value;
    provide a brake system model that determines a deceleration variable of the at least one brake from an input control variable value;
    input the possible control variable value into the brake system model; and determine a possible deceleration variable of the at least one brake that corresponds to the possible control variable value by way of the brake system model, wherein the vehicle comprises at least one further brake system having at least one further brake, the possible deceleration variable of which is not determined by the brake system model, wherein the possible deceleration variable of the at least one further brake is determined from an achieved brake effect in case of braking actually being effected.

12. A vehicle comprising the device of claim 11.

13. The vehicle according to claim 12, wherein the vehicle is a commercial vehicle, a lorry, a trailer, a bus and/or as a combination of a towing vehicle and a trailer, and/or the vehicle is a vehicle driven purely by electric motor, by hybrid drive, or by conventional drive.

14. A computer product comprising a nontransitory computer readable medium having stored thereon program code configured so that, when executed on a data processing unit, the program code causes said data processing unit to:

provide a possible control variable value that corresponds to an actual control variable value that is settable by the brake system, wherein the at least one brake is designed to generate a deceleration variable in response to a control variable of said actual control variable value;

provide a brake system model that determines a deceleration variable of the at least one brake from an input control variable value;

input the possible control variable value into the brake system model;

determine a possible deceleration variable of the at least one brake that corresponds to the possible control variable value by way of the brake system model; and determine the possible deceleration variable of at least one further brake in at least one further brake system from an achieved brake effect in case of braking actually being effected, wherein the possible deceleration variable of the at least one further brake is not determined by the brake system model.

* * * * *